US010797836B2

(12) United States Patent
Thrasher (10) Patent No.: US 10,797,836 B2
(45) Date of Patent: Oct. 6, 2020

(54) MEASUREMENT OF DATA STREAMS COMPRISING DATA AND PILOT CHANNELS

(71) Applicant: QUALCOMM Incorporated, San Diego, CA (US)

(72) Inventor: Robert Dale Thrasher, Irvine, CA (US)

(73) Assignee: QUALCOMM Incorporated, San Diego, CA (US)

(*) Notice: Subject to any disclaimer, the term of this patent is extended or adjusted under 35 U.S.C. 154(b) by 20 days.

(21) Appl. No.: 15/859,631

(22) Filed: Dec. 31, 2017

(65) Prior Publication Data

US 2019/0207729 A1 Jul. 4, 2019

(51) Int. Cl.
| | |
|---|---|
| *H04L 1/00* | (2006.01) |
| *H04L 5/00* | (2006.01) |
| *H04B 1/707* | (2011.01) |
| *H04B 7/26* | (2006.01) |
| *G01S 19/24* | (2010.01) |

(52) U.S. Cl.
CPC ............ *H04L 5/0048* (2013.01); *G01S 19/24* (2013.01); *H04B 1/707* (2013.01); *H04B 7/2628* (2013.01); *H04L 1/0048* (2013.01); *H04L 1/0057* (2013.01); *H04L 1/0071* (2013.01); *H04B 2001/70724* (2013.01)

(58) Field of Classification Search
CPC ... H04L 5/0048; H04L 1/0048; H04L 1/0056; H04L 1/0057; H04L 1/0071
See application file for complete search history.

(56) References Cited

U.S. PATENT DOCUMENTS

| | | | | |
|---|---|---|---|---|
| 5,691,974 | A | * 11/1997 | Zehavi | ................ H04B 1/7085 |
| | | | | 370/203 |
| 6,683,907 | B2 | 1/2004 | Ling et al. | |
| 6,987,799 | B2 | 1/2006 | McDonough et al. | |
| 7,336,640 | B2 | 2/2008 | McDonough et al. | |
| 7,376,206 | B1 | 5/2008 | Simic et al. | |
| 7,388,541 | B1 | * 6/2008 | Yang | .................... G01C 21/206 |
| | | | | 342/464 |
| 8,964,814 | B2 | 2/2015 | Rowitch | |

(Continued)

FOREIGN PATENT DOCUMENTS

| | | |
|---|---|---|
| CN | 107037457 A | 8/2017 |
| JP | 2005265476 A | 9/2005 |

(Continued)

OTHER PUBLICATIONS

Borio D., et al., "Collaborative Code Tracking of Composite GNSS Signals", IEEE Journal of Selected Topics in Signal Processing, IEEE, US, vol. 3, No. 4, Aug. 1, 2009 (Aug. 1, 2009), pp. 613-626, XP011264287, ISSN: 1932-4553.

(Continued)

*Primary Examiner* — Kent Krueger
(74) *Attorney, Agent, or Firm* — MG-IP Law, P.C.

(57) ABSTRACT

A method comprises receiving a data signal on a data channel and a pilot signal on a pilot channel, demodulating the received data signal and the received pilot signal to obtain a demodulated data signal and a demodulated pilot signal, generating a data stream by decoding the demodulated data signal, generating a feedback signal by encoding the data stream, and performing a measurement of a coherent sum signal comprising the coherent sum of (1) the demodulated pilot signal and (2) the product of the demodulated data signal and the feedback signal.

30 Claims, 5 Drawing Sheets

(56) References Cited

U.S. PATENT DOCUMENTS

| | | |
|---|---|---|
| 2004/0184513 A1 | 9/2004 | Lundby et al. |
| 2006/0031696 A1 | 2/2006 | King et al. |
| 2007/0057841 A1 | 3/2007 | McBurney et al. |
| 2007/0066268 A1 | 3/2007 | Simic et al. |
| 2007/0071072 A1 | 3/2007 | Banister et al. |
| 2007/0201537 A1 | 8/2007 | De Wilde et al. |
| 2009/0189808 A1 | 7/2009 | Chen |
| 2009/0219201 A1* | 9/2009 | Martin .................. G01S 19/23 342/357.62 |
| 2009/0279592 A1 | 11/2009 | Pratt et al. |
| 2009/0309791 A1 | 12/2009 | Chen |
| 2010/0254492 A1 | 10/2010 | Chen |
| 2011/0006947 A1 | 1/2011 | Pon et al. |
| 2011/0261805 A1* | 10/2011 | Landry, Jr. ............ G01S 19/24 370/342 |
| 2011/0279318 A1 | 11/2011 | Lennen |

FOREIGN PATENT DOCUMENTS

| | | |
|---|---|---|
| JP | 2007267087 A | 10/2007 |
| JP | 2009542072 A | 11/2009 |
| WO | 0241595 A2 | 5/2002 |
| WO | 2007148081 A1 | 12/2007 |

OTHER PUBLICATIONS

Borio D., et al., "Data and Pilot Combining for Composite GNSS Signal Acquisition", International Journal of Navigation and Observation, vol. 2008, Article ID. 738183, 2008, 12 Pages.

Fortin M-A., et al., "Implementation Strategies for a Universal Acquisition and Tracking Channel Applied to Real GNSS Signals", Sensors, MDPI, May 2016, pp. 1-26.

Roudier M., "Definition of Signals and Processing Techniques Innovative for Future GNSS Systems", Jan. 16, 2015, 215 Pages.

Won J-H., et al., "Optimum Data Rate and Signal Power Split for Next generation GNSS Architectures", 22nd International Meeting of the Satellite Division of the Institute of Navigation, Sep. 25, 2009 (Sep. 25, 2009), pp. 2942-2955, XP002637397, Savannah, U.S.A.

International Search Report and Written Opinion—PCT/US2018/059706, ISA/EPO—dated Jan. 31, 2019.

* cited by examiner

MEASUREMENT OF DATA STREAMS COMPRISING DATA AND PILOT CHANNELS

INTRODUCTION

Aspects of this disclosure relate generally to telecommunications, and more particularly to improved measurement and/or tracking of data streams and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.).

Some implementations of a multiple-access system use Code Division Multiple Access (CDMA). For example, Wideband CDMA (W-CDMA) is used in the Universal Mobile Telecommunications System Third Generation (UMTS 3G) mobile telecommunications standard. As another example, satellite positioning systems (SPS), such as the Global Positioning System (GPS) and the Global Navigation Satellite System (GNSS), also use CDMA. SPS transmitters (for example, satellites) may be positioned at a particular known location relative to the globe. The SPS transmitter transmits a combination of signals, the first being a data channel (DATA) carrying a message from the SPS transmitter, and the second being a pilot channel (PILOT) (sometimes referred to as a "data-less channel") that carries a pseudo random noise (PRN) code. The PRN code begins transmission at a predetermined time and repeats indefinitely. The PRN code may be unique to the SPS transmitter and orthogonal to the PRN codes associated with other SPS transmitters. In some implementations, the PRN code has 1023 bits and repeats every microsecond (1 MHz). PILOT has a known bit sequence and a predetermined phase relationship with DATA, which facilitates demodulation of DATA.

The received SPS signal has a certain total energy. That total energy is divided between DATA and PILOT, both of which have a fraction of the energy in the received SPS signal. In some scenarios, the energy of PILOT is not sufficient for accurate tracking of the PRN code. Accordingly, there is a need for systems and methods that increase the energy of PILOT, resulting in improved tracking sensitivity and reduced measurement noise.

SUMMARY

The following summary is an overview provided solely to aid in the description of various aspects of the disclosure and is provided solely for illustration of the aspects and not limitation thereof.

In accordance with aspects of the disclosure, a method is disclosed. The method may comprise, for example, receiving a data signal on a data channel and a pilot signal on a pilot channel, demodulating the received data signal and the received pilot signal to obtain a demodulated data signal and a demodulated pilot signal, generating a data stream by decoding the demodulated data signal, generating a feedback signal by encoding the data stream, and performing a measurement of a coherent sum signal comprising the coherent sum of (1) the demodulated pilot signal and (2) the product of the demodulated data signal and the feedback signal.

In accordance with aspects of the disclosure, an apparatus is disclosed. The apparatus may comprise, for example, one or more antenna, one or more demodulators, a decoder, an encoder, and a tracking loop. The one or more antenna may be configured to, for example, receive a data signal on a data channel and a pilot signal on a pilot channel. The one or more demodulators may be configured to, for example, demodulate the received data signal and the received pilot signal to obtain a demodulated data signal and a demodulated pilot signal. The decoder may be configured to, for example, generate a data stream by decoding the demodulated data signal. The encoder may be configured to, for example, generate a feedback signal by encoding the data stream. The tracking loop may be configured to, for example, perform a measurement of a coherent sum signal comprising the coherent sum of (1) the demodulated pilot signal and (2) the product of the demodulated data signal and the feedback signal.

In accordance with aspects of the disclosure, another apparatus is disclosed. The other apparatus may comprise, for example, means for receiving a data signal on a data channel and a pilot signal on a pilot channel, means for demodulating the received data signal and the received pilot signal to obtain a demodulated data signal and a demodulated pilot signal, means for generating a data stream comprising means for decoding the demodulated data signal, means for generating a feedback signal comprising means for encoding the data stream, and means for performing a measurement of a coherent sum signal comprising the coherent sum of (1) the demodulated pilot signal and (2) the product of the demodulated data signal and the feedback signal.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
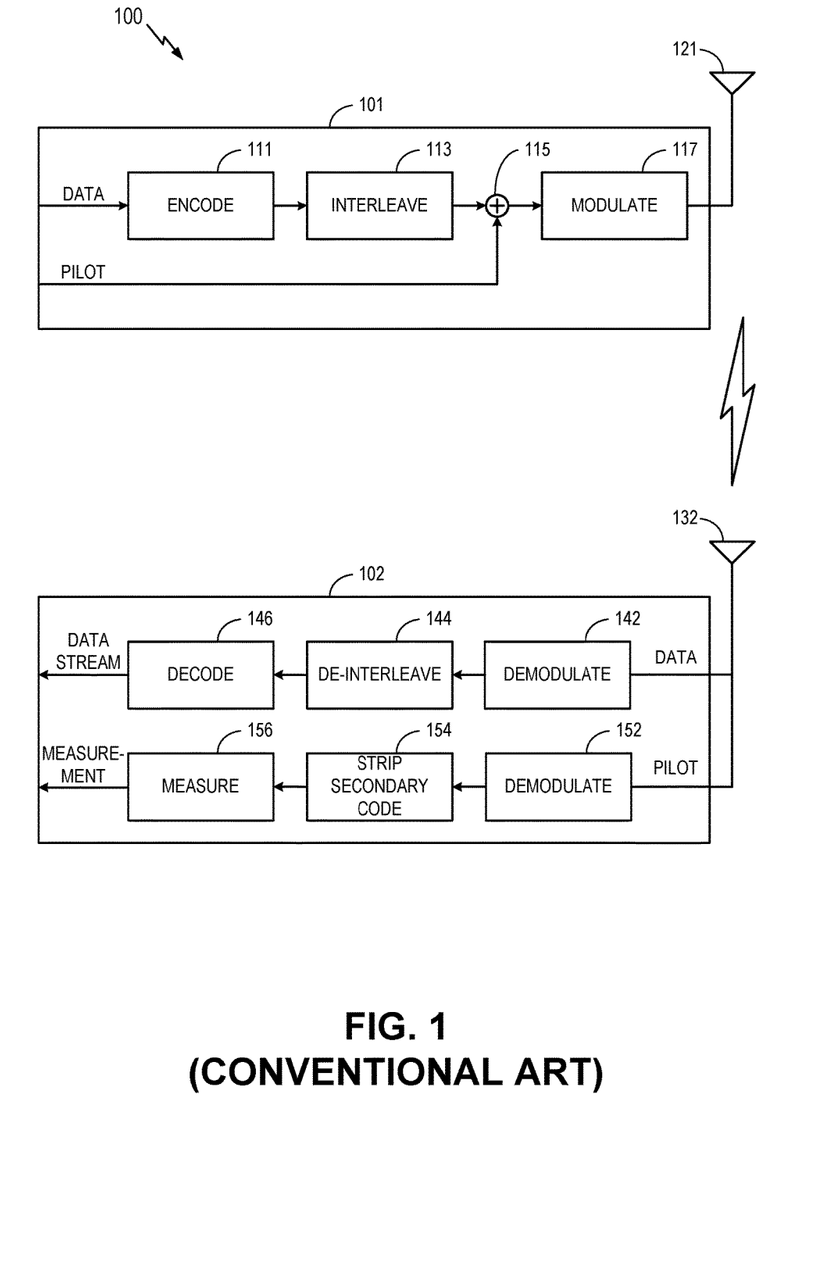
FIG. 1 generally illustrates a CDMA system in accordance with a conventional design.

FIG. 1 generally illustrates a CDMA system 100 in accordance with a conventional design. The CDMA system 100 may comprise a CDMA transmitter 101 and a CDMA receiver 102.

The CDMA transmitter 101 may comprise an encoder 111, an interleaver 113, a signal summer 115, a modulator 117, and an antenna 121. DATA may be a data stream having a sequence of data symbols for transmission to the CDMA receiver 102.

The encoder 111 may encode DATA. The encoder 111 may comprise, for example, a convolutional encoder. The encoder 111 may generate forward-error-correcting (FEC) code based on DATA. The interleaver 113 may rearrange data symbols in the code by dispersing consecutive bits. The dispersing may make the signal less susceptible to burst errors that interfere with a plurality of consecutive symbols.

Once DATA is encoded and interleaved, the signal summer 115 may add PILOT to DATA. PILOT may comprise, for example, a repeating PRN code. The modulator 117 may modulate the summed signal for transmission, and the antenna 121 may transmit the modulated signal from the CDMA transmitter 101.

The CDMA receiver 102 may comprise an antenna 132 configured to receive signals transmitted by the CDMA transmitter 101. The signal received by the antenna 132 may have a DATA component and a PILOT component. The DATA component may be provided to a DATA channel comprising a demodulator 142, a deinterleaver 144 and a decoder 146. The demodulator 142 may demodulate DATA, the deinterleaver 144 may de-interleave the demodulated DATA, for example, by reversing the interleaving performed by the interleaver 113 (at the CDMA transmitter 101). The decoder 146 may decode DATA, for example, by reversing the encoding performed by the encoder 111 (at the CDMA transmitter 101). The output of the decoder 146 may be a data stream. The data stream may comprise, for example, almanac and/or ephemeris data indicating various SPS transmitter characteristics associated with the CDMA transmitter 101.

The PILOT component may be provided to a PILOT channel comprising a demodulator 152, a code stripper 154, and a tracking loop 156 for outputting a measurement. The demodulator 152 may demodulate PILOT, the code stripper 154 may strip PILOT of secondary code, and the tracking loop 156 may measure PILOT.

In SPS, for example, PILOT is correlated with a locally-generated PRN code that matches the remotely-generated PRN code of a particular SPS transmitter. In some implementations, the correlating of PILOT is performed by the demodulator 152. The locally-generated PRN code is generated at the same predetermined absolute time as the PRN code transmitted from the SPS transceiver. To determine the timing, the locally-generated PRN code is correlated with the received PRN code. If the correlation is low, then a delayed version of the locally-generated PRN code is re-correlated with the received PRN code. The delay increments upward until a high correlation is detected. If a high correlation is detected, this indicates that the locally-generated PRN code (which has been delayed by a known amount) matches the received PRN code. The time of flight (TOF) from the SPS transmitter to the SPS receiver can be deduced from the amount of delay required to achieve a high correlation.

Signals received from a plurality of different SPS transmitters may be used by the SPS receiver to estimate the geographic position of the SPS receiver relative to each of the different SPS transmitters. For example, if the SPS receiver calculates three TOF values relating to three different SPS transmitters, then the SPS receiver can resolve three pseudo-ranges and determine the position of the SPS receiver. In some implementations, a signal received from a fourth SPS transmitter is used to determine a local clock bias, so that the delay can be determined accurately. From the three pseudo-ranges and the known positions of the SPS transmitters (received, for example, in DATA), the SPS receiver can determine its three-dimensional position (for example, in terms of latitude, longitude, altitude).

As will be understood from FIG. 1, the signal (having a certain energy) received at the antenna 132 is split into two channels, DATA and PILOT (each having a fraction of the total energy of the received signal). In some scenarios, the energy of PILOT is not sufficient for accurate tracking of the PRN code. Accordingly, there is a need for systems and methods that increase the energy of PILOT, resulting in improved tracking sensitivity and reduced measurement noise.

Figure 2:
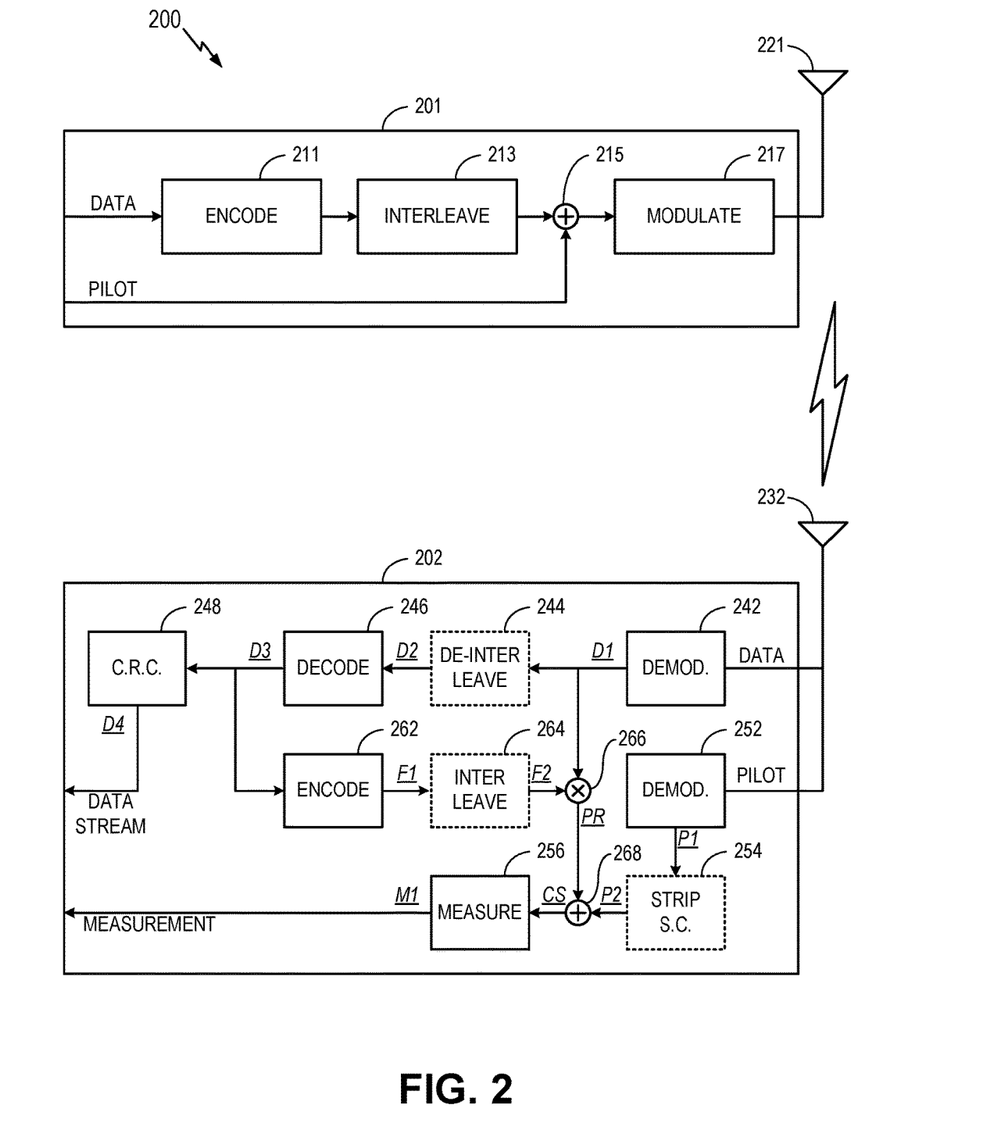
FIG. 2 generally illustrates a CDMA system in accordance with aspects of the disclosure.

FIG. 2 generally illustrates a CDMA system 200 in accordance with aspects of the disclosure. The CDMA system 200 may be a SPS system, a W-CDMA system, or any other system that uses CDMA. The CDMA system 200 may comprise a CDMA transmitter 201 and a CDMA receiver 202. As will be discussed in greater detail below, the CDMA receiver 202 recombines at least a portion of the energy from DATA into PILOT. Accordingly, the energy of PILOT is increased, resulting in improved tracking sensitivity and reduced measurement noise.

The CDMA transmitter 201 may be analogous in some respects to the CDMA transmitter 101 depicted in FIG. 1. For example, an encoder 211 may be analogous to the encoder 111, an interleaver 213 may be analogous to the interleaver 113, a signal summer 215 may be analogous to the signal summer 115, a modulator 217 may be analogous to the modulator 117, and an antenna 221 may be analogous to the antenna 121. For brevity, reiteration of the functioning of the CDMA transmitter 201 is omitted. It will be understood that the improved tracking sensitivity and reduced measurement noise achieved in accordance with aspects of the disclosure is obtained through systems and methods included in or performed by the CDMA receiver 202.

The CDMA receiver 202 may be analogous in some respects to the CDMA receiver 102. For example, an antenna 232 may be analogous to the antenna 132, a demodulator 242 and a demodulator 252 may be analogous to the demodulator 142 and demodulator 152, respectively, a deinterleaver 244 may be analogous to the deinterleaver 144, a decoder 246 may be analogous to the decoder 146, a code stripper 254 may be analogous to the code stripper 154, and a tracking loop 256 may be analogous to the tracking loop 156. In some implementations, CDMA receiver 202 may omit the deinterleaver 244 and interleaver 264, and/or the code stripper 254. It is understood that in both FIGS. 1 and 2, component blocks such as encoder 111, interleaver 113, demodulator 142, tracking loop 156, demodulator 242, deinterleaver 244, code stripper 254, tracking loop 256, etc., are shown labeled in text with functions or actions performed by each of the blocks, such as encode, interleave, demodulate, measure, de-interleave, code strip secondary code (S.C.), etc. Despite such labeling, it is understood that each of the component blocks can comprise corresponding hardware components such as an encoder, interleaver, demodulator, tracking loop, etc.

The demodulator 242 and the demodulator 252, like the demodulator 142 and demodulator 152 depicted in FIG. 1, respectively generate a demodulated DATA signal (labeled 'D1' in FIG. 2) and a demodulated PILOT signal (labeled P1'). The code stripper 254 may be omitted in implementations that do not use secondary code. Otherwise, the secondary code is stripped by the code stripper 254, resulting in a stripped signal (labeled P2').

The tracking loop 256 may operate analogously to the tracking loop 156, but in accordance with aspects of the disclosure, the tracking loop 256 may be provided with a higher-energy signal (relative to, for example, the signal provided to the tracking loop 156 in the conventional system of FIG. 1) in view of aspects described further below and with further reference to FIGS. 3, 4, and 5. Accordingly, tracking sensitivity can be improved and measurement noise can be reduced. The tracking loop 256 may be, for example, a phase-locked loop (PLL) or an automatic frequency control (AFC) loop. In a PLL, negative feedback may be used to modify an oscillator frequency in response to a determination that the phase of the oscillator has drifted relative to the phase of the input. The PLL may comprise, in series, a phase detector and a voltage controlled oscillator (VCO). The output of the VCO may be fed back to the phase detector, which generates a voltage proportional to the phase difference between the input frequency and the feedback frequency. In some implementations, the PLL may include a low pass filter between the phase detector and the VCO. The measurement generated by the PLL may comprise the output of the VCO. The measurement generated by the PLL may have a frequency and phase equivalent to the frequency and phase of the input provided to the PLL. The measurement may be used by the CDMA receiver 202 to demodulate DATA.

As will be understood from FIG. 2, the demodulated DATA signal D1 generated by the demodulator 242 is provided to the deinterleaver 244. However, by contrast to the arrangement depicted in FIG. 1, the demodulated DATA signal D1 is also provided to a signal multiplier 266.

The deinterleaved DATA signal (labeled 'D2') may be generated by the deinterleaver 244 and may be provided to the decoder 246. The decoded DATA signal (labeled 'D3') may be provided to a cyclical redundancy checker 248, which generates a valid data stream (labeled 'D4'). However, by contrast to the arrangement depicted in FIG. 1, the decoded DATA signal D3 may also be provided to an encoder 262, as depicted in FIG. 2. The encoder 262 may be a convolutional encoder. The re-encoded DATA signal (labeled 'F1') may be generated by the encoder 262 and provided to an interleaver 264. The output of the interleaver 264 may be a feedback signal (labeled 'F2'). The feedback signal F2 may be provided to the signal multiplier 266 (which, as noted above, also receives the demodulated DATA signal D1). The signal multiplier 266 may generate a product signal (labeled 'PR') comprising the product of the demodulated DATA signal D1 and the feedback signal F2.

It will be understood that although FIG. 2 depicts provision of the decoded DATA signal D3 to the encoder 262, a similar effect can be achieved by instead providing the valid data stream D4 to the encoder 262.

As noted above, the code stripper 254 generates a stripped PILOT signal P2 that is provided to the measurement circuit 256. However, before the stripped PILOT signal P2 is provided to the measurement circuit 256, the stripped PILOT signal P2 is combined with the product signal PR generated by the signal multiplier 266. The combining is performed by a signal summer 268. In some implementations, the signal summer 268 performs coherent summing, and generates a coherent sum signal (labeled 'CS') by coherently summing the stripped PILOT signal P1 and the product signal PR. The coherent sum signal CS provided to the measurement circuit 256 may have higher energy than the signal provided to the measurement circuit 156 depicted in FIG. 1. As a result, the measurement signal provided by the measurement circuit 256 (labeled 'M1' in FIG. 2) may benefit from improved tracking sensitivity and reduced measurement noise.

The measurement signal provided by the tracking loop 256 may also be used for producing a navigation solution. As noted above, the output of the tracking loop 256 is used for, among other things, demodulating DATA. As such, the tracking must be performed on an initial pass without the benefit of decoded DATA. The demodulated DATA signal D1 may have the form of Equation (1), where A is the signal amplitude, D(n) is the encoded data stream (including a series of +1 and −1), and w is the residual frequency error:

$$D1(n)=A*D(n)*e^{j\omega t(n)} \quad (1)$$

It will be understood from Equation (1) that D1($n$) is a complex number. If there are no errors in decoding (as at 246), then the feedback signal FIG. 2, shown below in Equation (2), may have the same form as Equation (1):

$$F2(n)=A*D(n)*e^{j\omega t(n)} \quad (2)$$

The effect of the signal multiplier 266 is remove demodulation of DATA to generate a product signal PR having the same phase angle as stripped pilot signal P2. The product signal PR may have the form of Equation (3):

$$PR(n)=A*e^{j\omega t(n)} \quad (3)$$

It will be understood that by adding the product signal PR (having the same phase angle as the stripped pilot signal P2) to the stripped pilot signal P2 itself, the signal-to-noise ratio is improved. As a result, the measurement performed by the measurement circuit 256 on the coherent sum signal CS may be more accurate relative to a measurement performed on the stripped pilot signal P2 alone.

Then, the CDMA receiver 202 may track PILOT in order to demodulate and decode DATA. In accordance with aspects of the disclosure, after DATA has been decoded, the CDMA receiver 202 performs a second pass on DATA (this time, using decoded DATA ('D3') rather than non-decoded data (such as in 'D1'). On the second pass, the CDMA receiver 202 performs operations with elements 262, 264, 266, 268, 256, as described above. As a result, the SNR of the signal that is measured at 256 is improved.

It will be understood that the various blocks depicted in FIG. 2 may represent hardware configured to perform the specified functions, software modules configured to be executed by a processing system, or any combination thereof.

Figure 3:
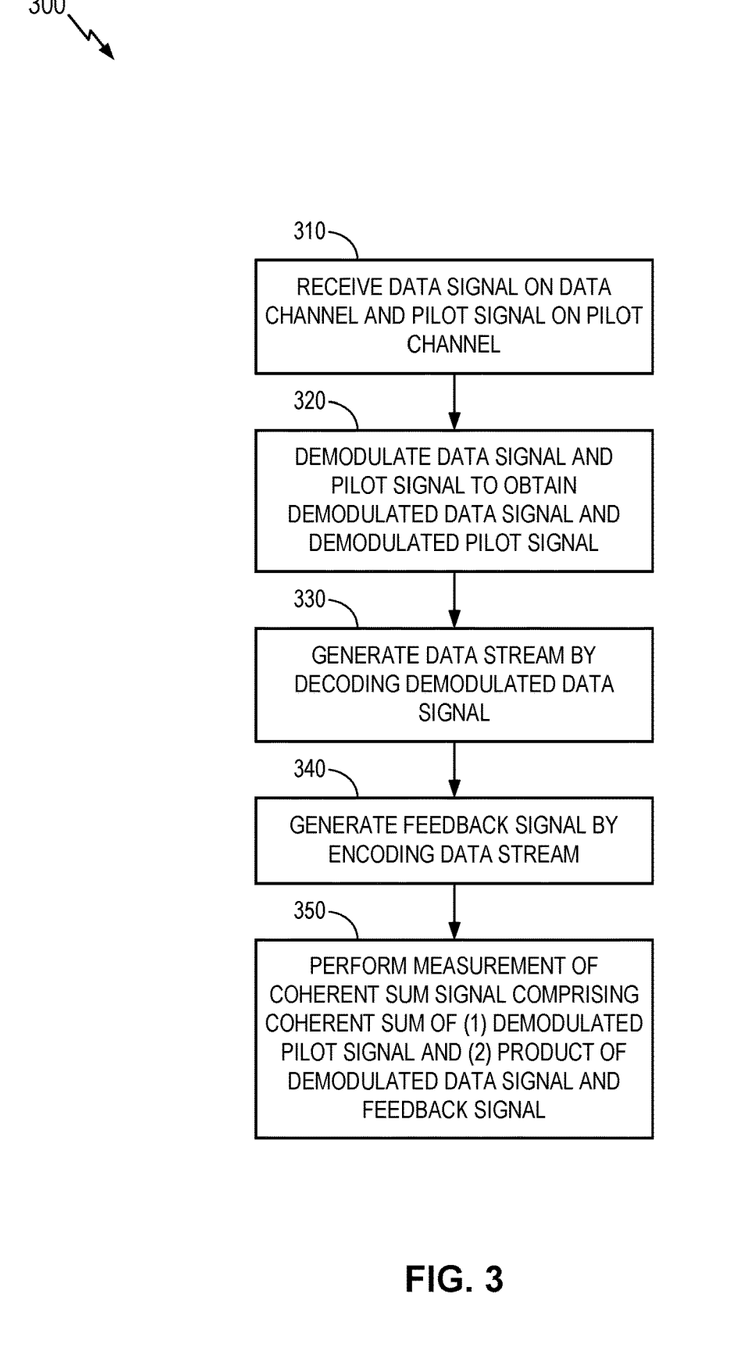
FIG. 3 generally illustrates a method for improving measurement in a CDMA system.

FIG. 3 generally illustrates a method 300 for improving measurement in a CDMA system. The method 300 may be performed by, for example, a CDMA receiver analogous to the CDMA receiver 202 depicted in FIG. 2, and/or one or more components thereof.

At 310, the method 300 receives a data signal on a data channel and a pilot signal on a pilot channel. The receiving at 310 may be performed by, for example, an antenna analogous to the antenna 232 depicted in FIG. 2. It will be understood that the antenna 232 may constitute a means for receiving a data signal on a data channel and/or a means for receiving a pilot signal on a pilot channel.

At 320, the method 300 demodulates the data signal and pilot signal to obtain a demodulated data signal and a demodulated pilot signal. The demodulating at 320 may be performed by, for example, one or more demodulators analogous to the demodulator 242 and/or demodulator 252 depicted in FIG. 2. It will be understood that the demodulator 242 and/or demodulator 252 may constitute means for demodulating the data signal and pilot signal to obtain a demodulated data signal and a demodulated pilot signal.

At 330, the method 300 generates a data stream by decoding the demodulated data signal. The generating at 330 may be performed by, for example, a decoder analogous to the decoder 246 depicted in FIG. 2. It will be understood that the decoder 246 may constitute a means for generating a data stream by decoding the demodulated data signal.

At 340, the method 300 generates a feedback signal by encoding the data stream. The generating at 340 may be performed by, for example, an encoder analogous to the encoder 262 depicted in FIG. 2. The result of the generating at 340 may be the re-encoded data stream F1. It will be understood that the encoder 262 and/or the optional interleaver 264 may constitute a means for generating a feedback signal by encoding the data stream.

At 350, the method 300 performs a measurement of a coherent sum signal, the coherent sum signal comprising a coherent sum of (1) the demodulated pilot signal and (2) the product of the demodulated data signal and the feedback signal. The performing at 350 may be performed by, for example, a measurement circuit analogous to the tracking loop 256 depicted in FIG. 2. It will be understood that the tracking loop 256 may constitute a means for performing a measurement of a coherent sum signal comprising a coherent sum of (1) the demodulated pilot signal and (2) the product of the demodulated data signal and the feedback signal.

Figure 4:
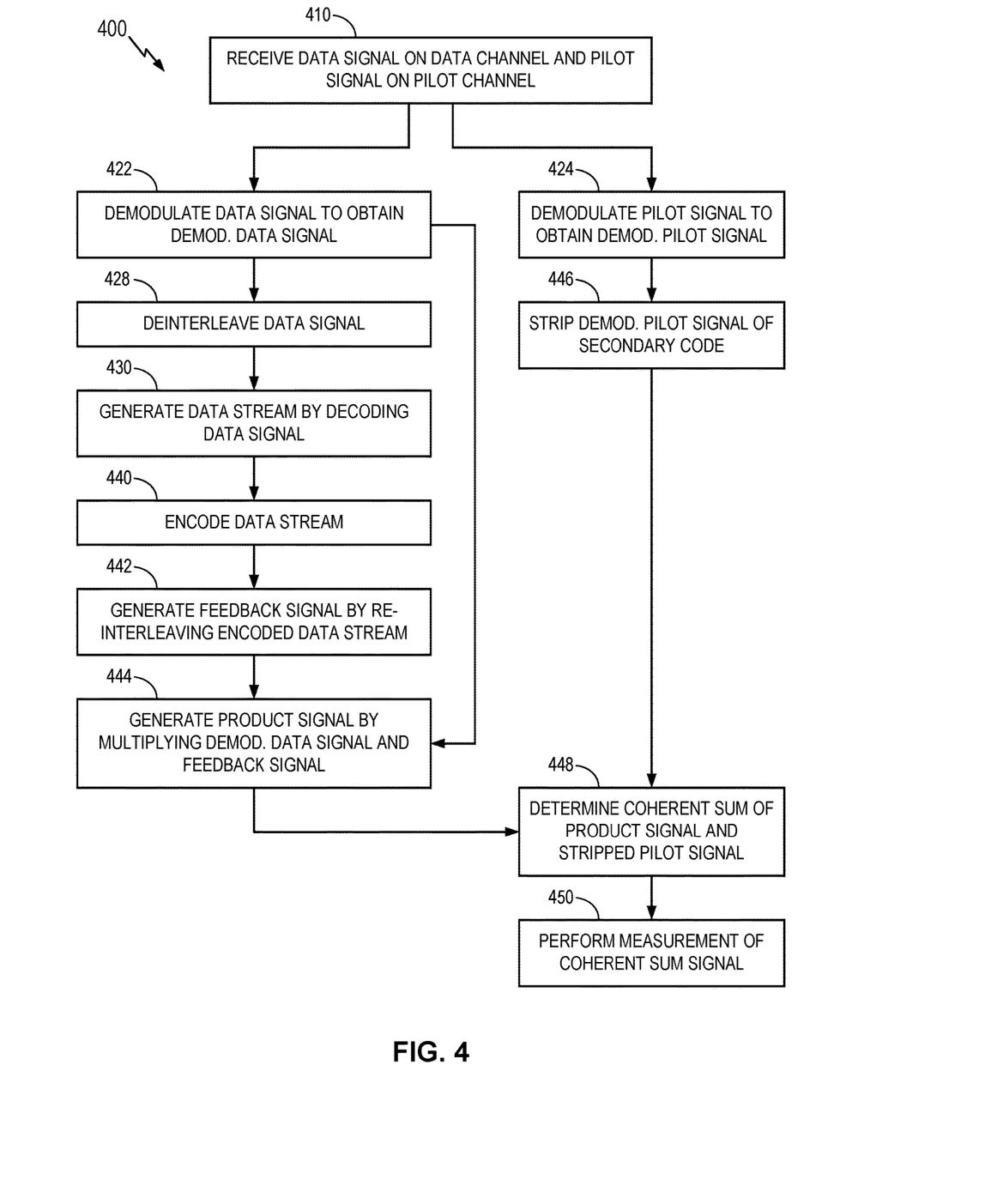
FIG. 4 generally illustrates a method for implementing the method of FIG. 3.

FIG. 4 generally illustrates a method 400 for implementing the method 300 of FIG. 3. Like the method 300, the method 400 may be used to improve measurement in a CDMA system. The method 400 may be performed by, for example, a CDMA receiver analogous to the CDMA receiver 202 depicted in FIG. 2, and/or one or more components thereof.

At 410, the method 400 receives a data signal on a data channel and a pilot signal on a pilot channel. The receiving at 410 may be analogous to the receiving at 310 depicted in FIG. 3.

At 422, the method 400 demodulates the data signal to obtain a demodulated data signal. The demodulated data signal may correspond to the demodulated data signal D1 depicted in FIG. 2. At 424, the method 400 demodulates the pilot signal to obtain a demodulated pilot signal. The demodulated pilot signal may correspond to the demodulated pilot signal P1 depicted in FIG. 2. The demodulating at 422 and the demodulating at 424 may be performed in parallel, as shown in FIG. 4.

At 428, the method 400 deinterleaves the data signal. The deinterleaving at 428 may be performed by, for example, the deinterleaver 244 depicted in FIG. 2. The deinterleaving at 428 may be performed on, for example, the demodulated data signal D1 depicted in FIG. 2. The result of the deinterleaving at 428 may be a deinterleaved data signal corresponding to the deinterleaved data signal D2.

At 430, the method 400 generates a data stream by decoding the data signal. The generating at 430 may be performed by, for example, the decoder 246 depicted in FIG. 2. The generating at 430 may be performed on, for example, the deinterleaved data signal D2. The result of the generating at 430 may be the decoded data signal D3 depicted in FIG. 2.

At 440, the method 400 encodes the data stream. The encoding at 440 may be performed by, for example, the encoder 262 depicted in FIG. 2. The encoding at 440 may be performed on, for example, the decoded data stream D3. The result of the encoding at 440 may be the re-encoded data stream F1 depicted in FIG. 2.

At 442, the method 400 generates a feedback signal by re-interleaving the encoded data stream. The generating at 442 may be performed by, for example, the interleaver 264 depicted in FIG. 2. The generating at 442 may be performed on, for example, the re-encoded data stream F1. The result of the generating at 442 may be the feedback signal F2 depicted in FIG. 2.

At 444, the method 400 generates a product signal by multiplying the demodulated data signal with the feedback signal. The generating at 444 may be performed by, for example, the signal multiplier 266 depicted in FIG. 2. The generating at 444 may be performed on, for example, the demodulated data stream D1 (which was previously obtained at 422) and the feedback signal F2. The result of the generating at 444 may be the product signal PR depicted in FIG. 2.

At 446, the method 400 strips the demodulated pilot signal of secondary code. The code stripping at 446 may be performed by, for example, the code stripper 254 depicted in FIG. 2. The code stripping at 446 may be performed on, for example, the demodulated pilot signal P1 obtained at 424. The result of the code stripping at 446 may be the stripped pilot signal P2 depicted in FIG. 2.

At 448, the method 400 determines a coherent sum of the product signal generated at 444 and the stripped pilot signal stripped at 446. The determining at 448 may be performed by, for example, the signal summer 268 depicted in FIG. 2. The result of the determining at 448 may be the coherent sum signal CS depicted in FIG. 2.

At 450, the method 400 performs a measurement of the coherent sum signal determined at 448. The performing at 450 may be performed by, for example, the measurement circuit 256 depicted in FIG. 2. The result of the performing at 450 may be a measurement signal M1.

Figure 5:
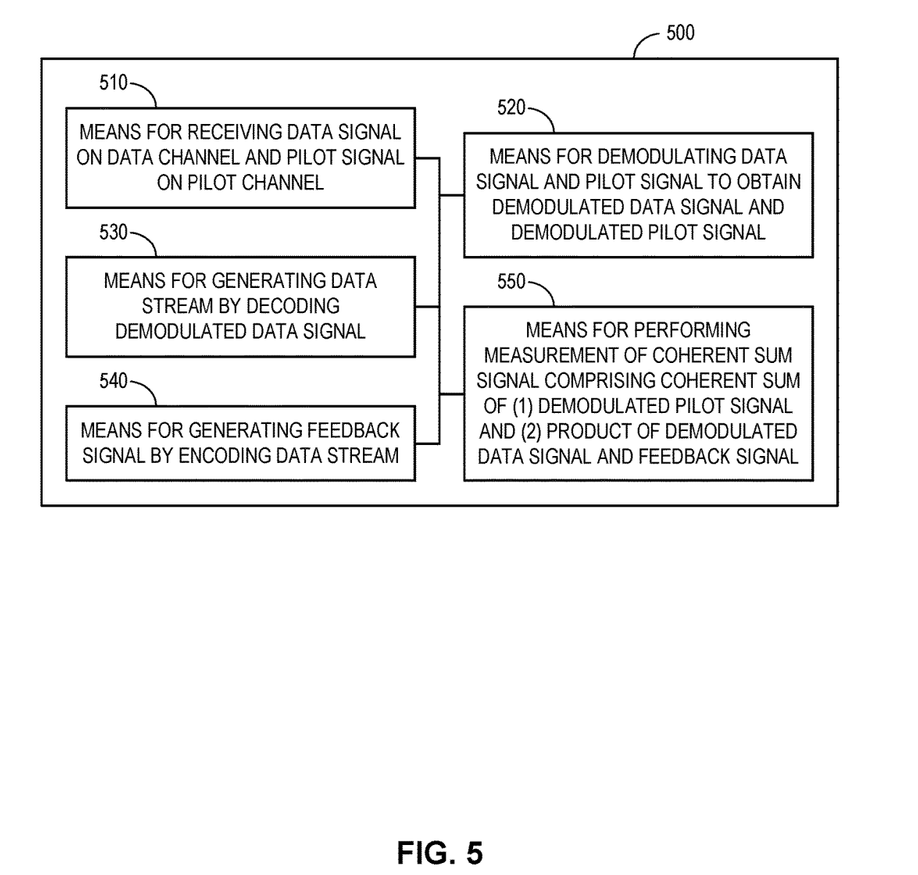
FIG. 5 generally illustrates an apparatus in accordance with aspects of the disclosure.

FIG. 5 generally illustrates an apparatus 500 comprising a means for receiving data signal on data channel and pilot signal on pilot channel 510, a means for demodulating data signal and pilot signal to obtain demodulated data signal and demodulated pilot signal 520, a means for generating data stream by decoding demodulated data signal 530, a means for generating feedback signal by encoding data stream 540, and a means for performing measurement of coherent sum signal comprising coherent sum of (1) demodulated pilot signal and (2) product of demodulated data signal and feedback signal 550.

As noted above, the means for receiving a data signal on a data channel and/or a means for receiving a pilot signal on a pilot channel may be constituted by, for example, the antenna 232 depicted in FIG. 2. Moreover, the means for demodulating data signal and pilot signal to obtain demodulated data signal and demodulated pilot signal 520 may be constituted by, for example, the demodulator 242 and/or demodulator 252 depicted in FIG. 2; the means for generating data stream by decoding demodulated data signal 530 may be constituted by, for example, the decoder 246 and/or optional de-interleaver 244 depicted in FIG. 2; the means for generating feedback signal by encoding data stream 540 may be constituted by, for example, the encoder 262 and/or optional interleaver 264 depicted in FIG. 2; and the means for performing measurement of coherent sum signal comprising coherent sum of (1) demodulated pilot signal and (2) product of demodulated data signal and feedback signal 550 may be constituted by, for example, the measurement circuit 256 depicted in FIG. 2.

In some implementations, the means for generating the data stream 530 may further comprise means for de-interleaving the demodulated data signal (constituted by, for example, the de-interleaver 244 depicted in FIG. 2). Moreover, the means for generating the feedback signal 540 may further comprise means for re-interleaving the encoded data stream (constituted by, for example, the interleaver 264 depicted in FIG. 2).

In some implementations, the apparatus 500 may further comprise means for stripping the demodulated pilot signal of secondary code (constituted by, for example, the code stripper 254 depicted in FIG. 2). Additionally or alternatively, the apparatus 500 may further comprise means for generating a product signal by multiplying the demodulated data signal and the feedback signal (constituted by, for example, the signal multiplier 266 depicted in FIG. 2). Additionally or alternatively, the apparatus 500 may further comprise means for generating the coherent sum signal by determining a coherent sum of the demodulated pilot signal and the product signal (constituted by, for example, the signal summer 268 depicted in FIG. 2). Additionally or alternatively, the apparatus 500 may further comprise means for validating the data stream comprising means for performing a cyclical redundancy check (constituted by, for example, the cyclical redundancy checker 248 depicted in FIG. 2). The functionality of the components 510-550 may be implemented in various ways consistent with the teachings herein. In some designs, one or more of the components 510-550 may be implemented as electronic hardware. Additionally or alternatively, one or more of the components 510-550 may be implemented as one or more integrated circuits (e.g., an ASIC). Additionally or alternatively, one or more of the components 510-550 may be implemented as a processing system including one or more processor components. The processing system may operate in tandem with a memory system including one or more memory components. The memory system may store data and/or instructions for performing the functionality of the processing system. The processing system may retrieve the data and/or instructions from the memory system before performing the operations.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof. Similarly, the phrase "based on" as used herein does not necessarily preclude influence of other factors and should be interpreted in all cases as "based at least in part on" rather than, for example, "based solely on".

It will be understood that terms such as "top" and "bottom", "left" and "right", "vertical" and "horizontal", etc., are relative terms used strictly in relation to one another, and do not express or imply any relation with respect to gravity, a manufacturing device used to manufacture the components described herein, or to some other device to which the components described herein are coupled, mounted, etc.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not imply that there are only two elements and further does not imply that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of non-transitory storage medium known in the art. As used herein the term "non-transitory" does not exclude any physical storage medium or memory and particularly does not exclude dynamic memory (e.g., RAM) but rather excludes only the interpretation that the medium can be construed as a transitory propagating signal. An example storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method comprising:
    receiving a data signal on a data channel and a pilot signal on a pilot channel;
    demodulating the received data signal and the received pilot signal to obtain a demodulated data signal and a demodulated pilot signal;
    generating a data stream by decoding the demodulated data signal;
    generating a feedback signal by encoding the data stream;

performing a measurement of a coherent sum signal comprising the coherent sum of:
the demodulated pilot signal; and
a product of the demodulated data signal and the feedback signal, wherein the product is generated by a multiplier that multiplies the demodulated data signal and the feedback signal to generate the product.

2. The method of claim 1, wherein the performing of the measurement includes using a tracking loop that tracks the coherent sum signal.

3. The method of claim 2, wherein the tracking loop includes one or both of a phase-locked loop and an automatic frequency control loop.

4. The method of claim 1, wherein:
the generating of the data stream comprises de-interleaving the demodulated data signal; and
the decoding is performed on the result of the de-interleaving.

5. The method of claim 1, wherein generating the feedback signal further comprises re-interleaving the encoded data stream.

6. The method of claim 1, further comprising stripping the demodulated pilot signal of secondary code.

7. The method of claim 1, further comprising generating a product signal by multiplying the demodulated data signal and the feedback signal.

8. The method of claim 7, further comprising generating the coherent sum signal by determining a coherent sum of the demodulated pilot signal and the product signal.

9. The method of claim 1, wherein the data signal is forward-error-correction encoded.

10. The method of claim 1, further comprising validating the data stream by performing a cyclical redundancy check.

11. An apparatus, comprising:
one or more antenna configured to receive a data signal on a data channel and a pilot signal on a pilot channel;
one or more demodulators configured to demodulate the received data signal and the received pilot signal to obtain a demodulated data signal and a demodulated pilot signal;
a decoder configured to generate a data stream by decoding the demodulated data signal;
an encoder configured to generate a feedback signal by encoding the data stream; and
a tracking loop configured to perform a measurement of a coherent sum signal comprising the coherent sum of:
the demodulated pilot signal; and
a product of the demodulated data signal and the feedback signal, wherein the product is generated by a multiplier that multiplies the demodulated data signal and the feedback signal to generate the product.

12. The apparatus of claim 11, wherein the tracking loop tracks the coherent sum signal.

13. The apparatus of claim 12, wherein the tracking loop includes one or both of a phase-locked loop and an automatic frequency control loop.

14. The apparatus of claim 11, further comprising:
a de-interleaver configured to de-interleave the demodulated data signal to generate a de-interleaved signal;
wherein the decoder decodes the de-interleaved signal.

15. The apparatus of claim 11, further comprising an interleaver configured to re-interleave the encoded data stream to further generate the feedback signal.

16. The apparatus of claim 11, further comprising a code stripper configured to strip the demodulated pilot signal of secondary code.

17. The apparatus of claim 11, further comprising a signal multiplier configured to generate a product signal by multiplying the demodulated data signal and the feedback signal.

18. The apparatus of claim 17, further comprising a signal summer configured to generate the coherent sum signal by determining a coherent sum of the demodulated pilot signal and the product signal.

19. The apparatus of claim 11, wherein the decoder is configured to generate the data stream by generating a forward-error-corrected data stream.

20. The apparatus of claim 11, further comprising a cyclical redundancy checker configured to validate the data stream by performing a cyclical redundancy check.

21. An apparatus, comprising:
means for receiving a data signal on a data channel and a pilot signal on a pilot channel;
means for demodulating the received data signal and the received pilot signal to obtain a demodulated data signal and a demodulated pilot signal;
means for generating a data stream by decoding the demodulated data signal;
means for generating a feedback signal comprising means for encoding the data stream;
means for performing a measurement of a coherent sum signal comprising the coherent sum of:
the demodulated pilot signal; and
a product of the demodulated data signal and the feedback signal, wherein the product is generated by a multiplier that multiplies the demodulated data signal and the feedback signal to generate the product.

22. The apparatus of claim 21, wherein the means for performing the measurement comprises a tracking loop that tracks the coherent sum signal.

23. The apparatus of claim 22, wherein the tracking loop includes one or both of a phase-locked loop and an automatic frequency control loop.

24. The apparatus of claim 21, wherein:
the means for generating the data stream further comprises means for de-interleaving the demodulated data signal; and
the means for generating the data stream decodes a de-interleaved signal provided by the means for de-interleaving.

25. The apparatus of claim 21, wherein the means for generating the feedback signal further comprises means for re-interleaving the encoded data stream.

26. The apparatus of claim 21, further comprising means for stripping the demodulated pilot signal of secondary code.

27. The apparatus of claim 21, further comprising means for generating a product signal by multiplying the demodulated data signal and the feedback signal.

28. The apparatus of claim 27, further comprising means for generating the coherent sum signal by determining a coherent sum of the demodulated pilot signal and the product signal.

29. The apparatus of claim 21, wherein the data signal is forward-error-correction encoded.

30. The apparatus of claim 21, further comprising means for validating the data stream comprising means for performing a cyclical redundancy check.

* * * * *